W. C. CARR.
COMBINED SWITCHBOARD AND RHEOSTAT FOR CONTROLLING THE CHARGING OF ELECTRIC STORAGE BATTERIES.
APPLICATION FILED JUNE 12, 1912.

1,248,074.

Patented Nov. 27, 1917.
2 SHEETS—SHEET 1.

WITNESSES

INVENTOR
William C. Carr,
BY
ATTORNEY

W. C. CARR.
COMBINED SWITCHBOARD AND RHEOSTAT FOR CONTROLLING THE CHARGING OF ELECTRIC STORAGE BATTERIES.
APPLICATION FILED JUNE 12, 1912.
1,248,074.
Patented Nov. 27, 1917.
2 SHEETS—SHEET 2.
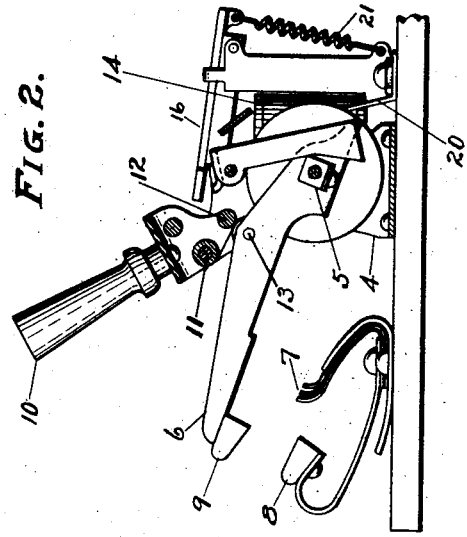
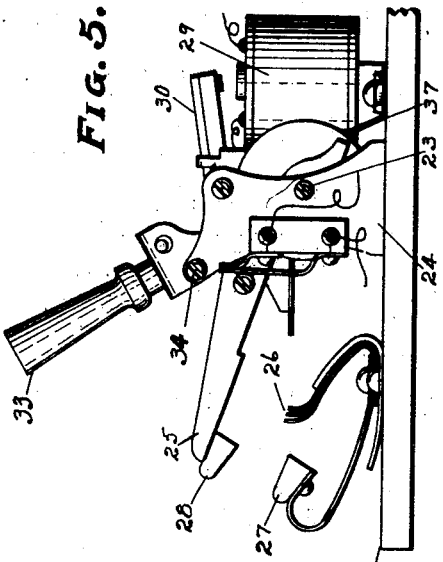
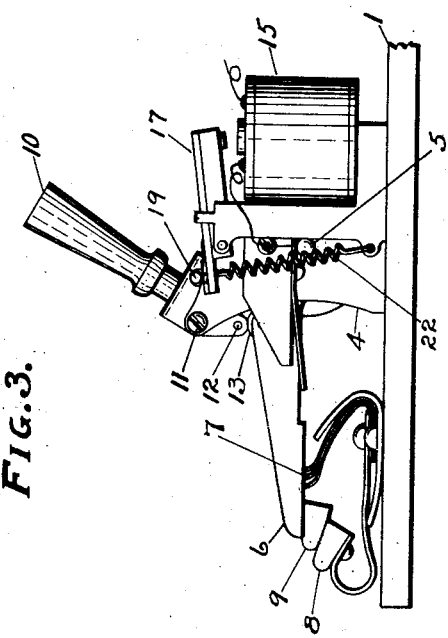
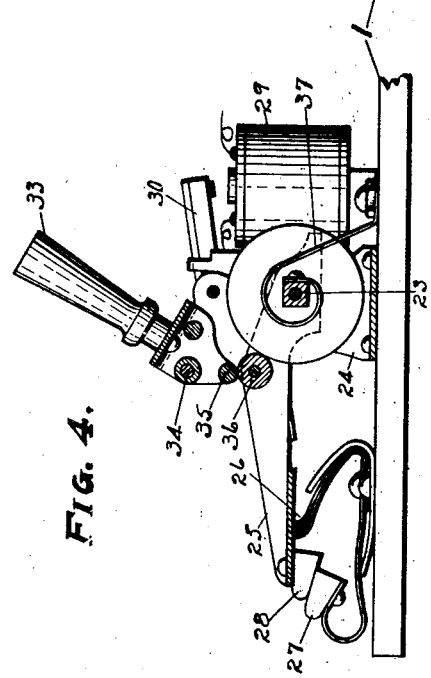
WITNESSES
D. H. Harper
W. A. Sparks
INVENTOR
William C. Carr
BY
ATTORNEY

UNITED STATES PATENT OFFICE.

WILLIAM C. CARR, OF BUFFALO, NEW YORK.

COMBINED SWITCHBOARD AND RHEOSTAT FOR CONTROLLING THE CHARGING OF ELECTRIC STORAGE BATTERIES.

1,248,074. Specification of Letters Patent. Patented Nov. 27, 1917.

Application filed June 12, 1912. Serial No. 703,104.

*To all whom it may concern:*

Be it known that I, WILLIAM C. CARR, a citizen of the United States, residing at Buffalo, in the county of Erie and State of New York, have invented a certain new and useful Improvement in Combined Switchboards and Rheostats for Controlling the Charging of Electric Storage Batteries, of which the following is a specification.

This invention relates to improvements in a combined switchboard and rheostat for controlling the charging of electric storage batteries.

The primary objects of the invention are to automatically govern the charging of electric storage batteries, to prevent excessive voltage during the charging of storage batteries by providing means to automatically reduce or step down the voltage, and to automatically break the circuit to prevent overcharging when the storage battery is charged to its desired capacity.

The invention also relates to certain details of construction which will be hereinafter described and claimed, reference being had to the accompanying drawings in which preferred embodiment of the machine or apparatus is illustrated.

Fig. 2, is a central vertical section through the master contact-breaker on the line $a$—$a$, Fig. 1, looking in one direction.

Fig. 3, is a central vertical section through the master contact-breaker looking in the opposite direction to Fig. 2.

Fig. 4 is a vertical section through one of the shunt coil circuit breakers on line $b$—$b$ of Fig. 1.

Fig. 5, is a side elevation of one of the shunt coil circuit breakers for cutting out one of the coil windings of the rheostat.

In referring to the preferred embodiment of the invention shown in the accompanying drawings in detail like numerals designate like parts.

Figure 1:
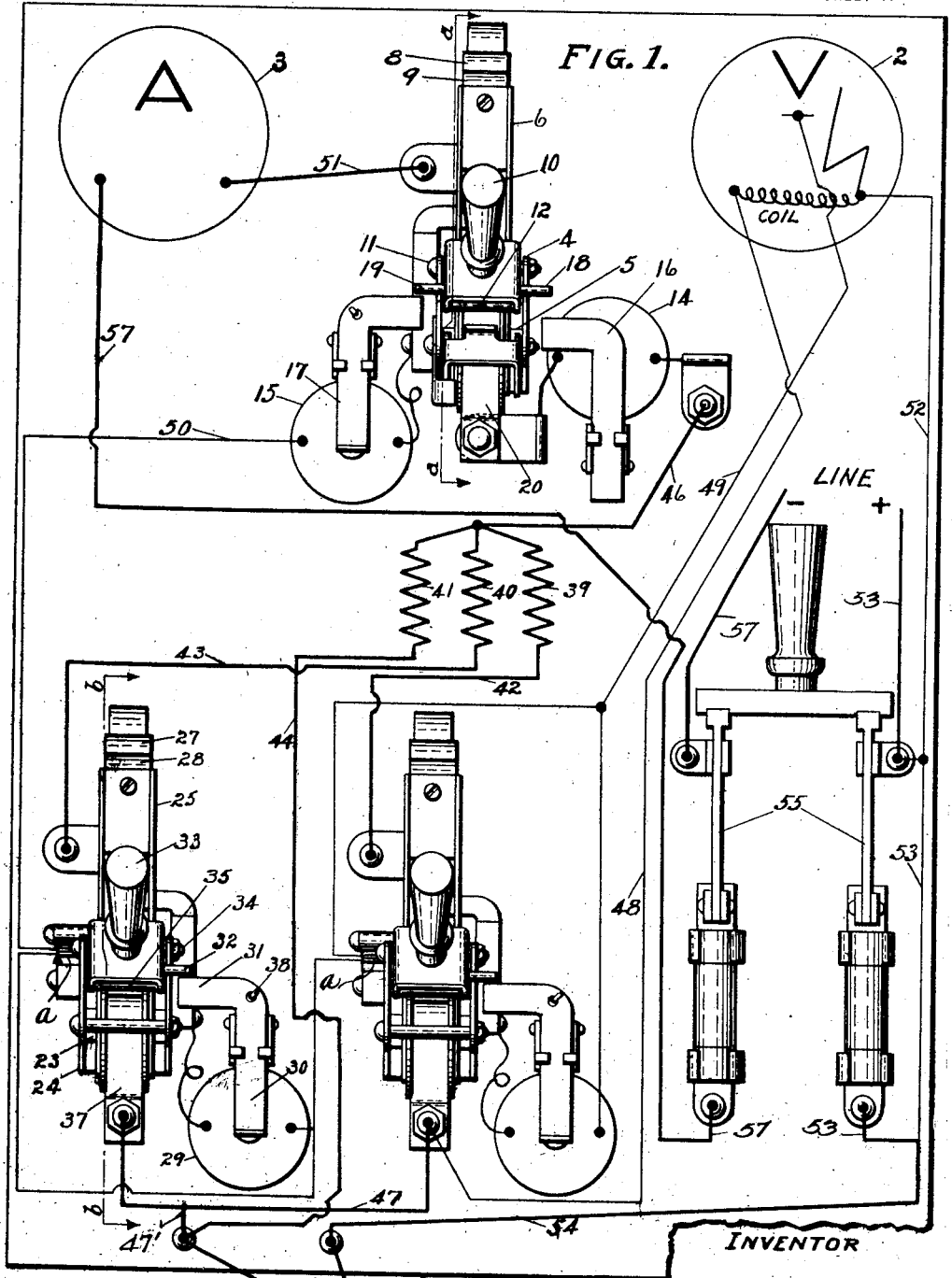
Figure 1, represents a part diagrammatic and part plan view of the combined switchboard and rheostat, the current connections being shown in heavy lines and the voltage connections in light lines.

The switchboard proper is preferably a flat, fairly thick sheet 1, of asbestos board or other suitable material, the automatic controlling devices, voltmeter, amperemeter, and switch being usually placed on the front face of the board 1, with the wiring on the back face thereof, the rheostat is also usually placed on or attached to the back face.

However, for the purpose of clearly and comprehensively illustrating the manner of connecting and wiring the various elements and parts to each other, they are all shown in Fig. 1, on the front face of the board 1.

Referring to Fig. 1, a voltmeter 2, is attached to one of the upper corners of the board 1, and an amperemeter 3, to the opposite upper corner.

These meters are preferably of the well known adjustable type so that they can be regulated or set for any desired amperage and voltage.

The amperemeter is connected to a master contact breaker which is constructed substantially as shown in Figs. 1, 2 and 3, and is arranged to be automatically operated from the voltmeter to break the circuit.

The master contact breaker consists of a bracket or base 4, which is fastened to the face of the board, 1, a shaft, 5, journaled in said base so as to rock therein, a contact making and breaking arm 6, having its inner end permanently attached to the shaft 5, as shown in Figs. 2 and 3.

A spring device of angular form is attached to the board 1, below the master contact breaker and has one of its ends bent outward and downward and formed of a plurality of metal strips to constitute a brush 7, which is adapted to contact with the under surface of the arm 6, when said arm is in its contact making position.

The opposite end of the spring is also bent upon itself and is provided with a block 8, of insulating material which is attached to the outer end thereof and is adapted to contact with and press against a similar block 9, attached to the outer end of the arm 6, when said arm is in contact making position.

A manually operated handle 10, is pivoted to the frame of the bracket or base 4, by a pivot pin 11, and the inner end of said arm is forked or bifurcated as shown in Fig. 1, and carries a roller 12, at its lower extremity which is adapted to contact with a similar roller 13, journaled in an intermediate portion of the arm 6.

Two coils, a service coil 14 and a shunt coil 15, are mounted on opposite sides of the bracket or base 4, and two armatures 16 and 17 are pivoted to the frame and are arranged to be actuated by a series coil 14 and a shunt coil 15, the armature 16 being located over the coil 14 and the armature 17 over the coil 15.

The inner ends of the armatures are bent inwardly at substantially right angles and are adapted to engage and contact with trip pins 18 and 19, which project laterally and in opposite directions from the handle.

The master contact breaker is moved into contact making position by the operator throwing the handle 10 downward which causes the roller 12, to contact with and roll on the roller 13, of the arm 6, moving said arm downward into circuit making contact with the brush 7.

When the handle 10, is in its lowered position and the arm 6, is in its circuit making position, the roller 12, is moved slightly past the center on the roller 13, and holds said arm in its depressed position until tripped and released by the vibration of one of the armatures, which strikes its complementary trip pin and throws the handle upward sufficiently to cause the roller 12, to roll past the center and allow the spring 20, attached to the arm 6, to pull said arm outward and break the electric circuit.

The armatures 16 and 17 are normally held out of contact with the shunt coils by springs 21 and 22.

Besides the master contact breaker, one or more auxiliary contact breakers are employed, and in the adaptation shown in the accompanying drawings, two are utilized.

As these auxiliary contact breakers are of identical construction, it is thought that a description of one will suffice for all.

Referring to Figs. 1, 4 and 5, a rock shaft 23, is journaled in a base or bracket 24, and a contact making and breaking arm 25, has its inner end fastened to said shaft 23.

A spring device similar to the spring device described with reference to the master contact breaker, is attached to the board 1, and has a brush 26, at one end adapted to contact with the arm 25, and an insulating block 27, at the opposite end adapted to contact with a similar insulating block 28, on the end of the arm 25.

A single shunt coil 29, is mounted on the base or bracket 24, and governs the movement of an armature 30 which is pivotally mounted in the base or bracket 24.

The inner end 31 of the armature is bent at a right angle and is adapted to contact with a trip pin 32, on a manually operated handle 33, when pulled down by the shunt coil.

The handle 33, is pivotally mounted in the bracket 24, being pivoted therein by a pivot pin 34, and is provided with a bifurcated inner end which carries a roller 35, adapted to roll on the surface of a roller 36, journaled in the arm 25, as shown in Fig. 5.

A spring 37, is attached to the shaft 23, and normally maintains the arm 25 in its circuit breaking position.

The armature 30, is also held in a non-connected position with respect to the shunt coil 29, by a spring 38.

A rheostat which in the embodiment shown, consists of three coil windings, is connected by wires to the contact breakers in such a manner, that the coil windings are successively cut out and finally when the storage battery is fully charged, the electric circuit is completely broken by the master circuit breaker.

Referring to Fig. 1, the coil windings of the rheostat are respectively indicated by the numerals 39, 40 and 41.

The first coil winding 39, is connected by a wire 42, to one of the auxiliary contact breakers, the second coil winding 40, by a wire 43, to the other auxiliary contact breaker, and the third coil winding 41, is connected by a wire 44, to the negative pole of a storage battery 45, all of the coil windings are also connected by a wire 46, to the master contact breaker.

The two auxiliary contact breakers are connected to each other by a wire 47, which latter is also connected to the negative side of the storage battery by the connection 47′, and to the voltmeter by a wire 48, and the shunt coils of the auxiliary contact breakers are also connected to the voltmeter by a wire 49.

The master contact breaker, is likewise connected to the auxiliary contact breakers by a wire 50, and to the amperemeter by a wire 51. The auxiliary circuit breakers are also in circuit with the voltmeter and the shunt coil of the master contact breaker through the wire 50′ connected to the wire 49 beyond the initial auxiliary contact breakers by mechanical switches $a$. These switches are of any usual or preferred type and operate to mechanically close when the auxiliary circuit breaker opens, connecting the circuit around the circuit breaker, and mechanically opens when the circuit breaker is closed to complete the circuit through such circuit breaker.

A wire 52, extends from the voltmeter to the main line wire 53, and said main line wire is connected by a wire 54, to the positive pole of a storage battery. A double pole switch 55 is attached to the board 1 forming the usual control of the mains 53 and 57, the latter being continued beyond the switch to the amperemeter.

The operation of this improved machine or apparatus is as follows:—

The handles of the master contact breaker and the auxiliary contact breakers, are moved downward by the operator, thereby throwing all of the contact making and breaking arms into contact making position.

A storage battery is now connected and the switch 55, is turned upward into contact to complete the electric circuit.

The electric current now flows into the storage battery, and when the voltage reaches a certain predetermined point, the shunt coil of one of the auxiliary circuit breakers is energized from the voltmeter and pulls its armature down, causing the bent end of the armature to strike against the trip pin of the handle of said auxiliary circuit breaker, turning said handle on its pivot sufficiently to release the contact making and breaking arm, thereby permitting the spring connected to said arm to pull said arm upward into its contact breaking position and cutting out the coil winding 39, of the rheostat.

This automatically reduces the voltage, while the current still flows to the storage battery through the two remaining coils of the rheostat.

The second coil winding 40, is automatically cut out in a like manner by the other auxiliary contact breaker when the voltage again reaches the predetermined point on the voltmeter.

The third coil winding 41, is automatically cut out when the storage battery is fully charged and the current is also entirely broken at the same time to prevent overcharging by the automatic operation of the master contact breaker.

I claim—

1. In a machine of the class described, a rheostat having a plurality of resistance sections, a like number of contact breakers, each of said contact breakers being in series circuit with one of the said sections, means for automatically operating each of the contact breakers, and a voltmeter in circuit with and controlling all of said means.

2. In a machine of the class described, a rheostat composed of a plurality of resistance sections, a similar number of contact breakers in series circuit with the respective said sections, electro-magnetic means for operating the contact breakers to break the contact and cut out the said sections, and a voltmeter having circuit control of all of said electro-magnetic means.

WILLIAM C. CARR.

Witnesses:
EDGAR L. KLEINDINST,
LUCIE M. THEES.

Copies of this patent may be obtained for five cents each, by addressing the "Commissioner of Patents Washington, D. C."